Oct. 22, 1940.    L. H. NORBY    2,219,051
RADIATOR SHUTTER
Filed Feb. 23, 1938
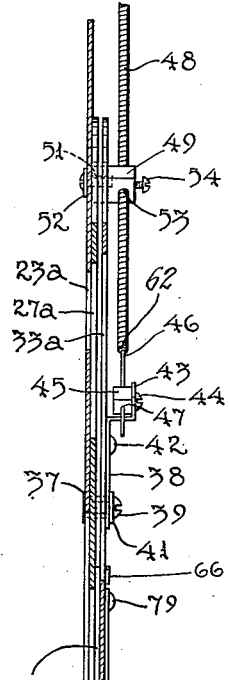
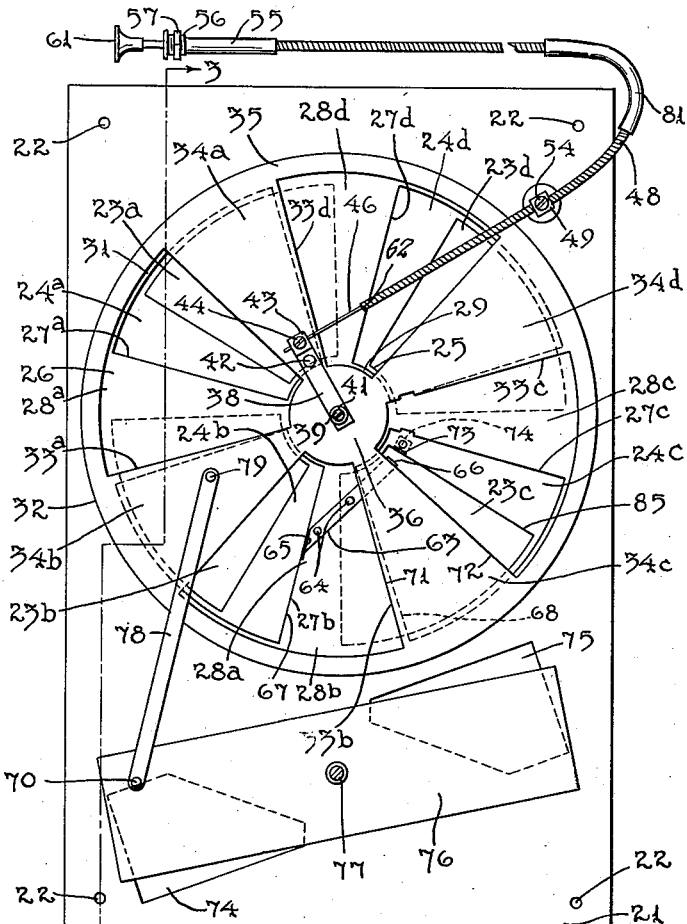
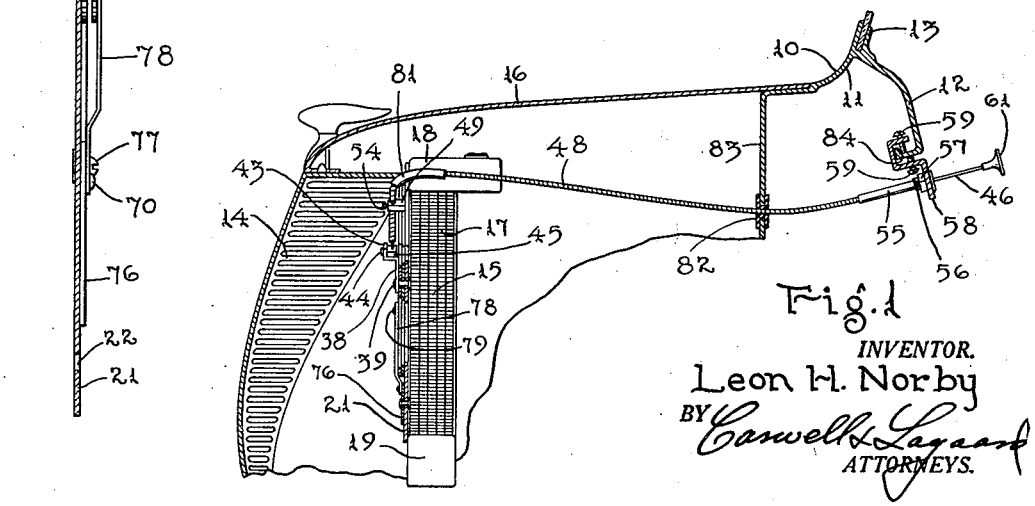
INVENTOR.
Leon H. Norby
BY Caswell & Lazaar
ATTORNEYS.

Patented Oct. 22, 1940

2,219,051

UNITED STATES PATENT OFFICE 2,219,051

RADIATOR SHUTTER

Leon H. Norby, Minneapolis, Minn.

Application February 23, 1938, Serial No. 192,042

6 Claims. (Cl. 189—61)

My invention relates to radiator shutters and has for an object to provide an extremely simple and inexpensive construction which may be easily applied to the radiators of existing automobiles.

An object of the invention resides in providing a shutter by means of which the front of an automobile radiator may be completely covered.

A still further object of the invention resides in providing a radiator shutter in which minimum obstruction exists when the shutter is fully opened.

An object of the invention resides in providing a radiator shutter utilizing a body member formed with segmental openings, an outer closure and an intermediate closure having segmental-shaped openings adapted to register with one another to form a minimum obstruction to the radiator when the shutter is in open position.

Another object of the invention resides in providing operating means for simultaneously operating both of said closures.

A still further object of the invention resides in providing a third closure positioned below the second closure and in providing means for operating the third closure from one of the first named closures.

Other objects of the invention reside in the novel combination and arrangement of parts and in the details of construction hereinafter illustrated and/or described.

In the drawing:

Fig. 1 is a longitudinal sectional view of a portion of an automobile illustrating the application of my invention thereto.

Fig. 2 is an elevational view of the radiator shutter detached from the automobile.

Fig. 3 is a longitudinal sectional view taken on line 3—3 of Fig. 2 and drawn to a larger scale.

In the present construction of automobiles, where radiator grills are employed, it becomes practically impossible to cover up the radiator of the automobile to limit the flow of air through the same during cold weather when the engine heat is desired for heating the cab of the automobile. The present invention provides an extremely simple and practical construction whereby the entire surface of the radiator may be covered and which can be installed adjacent the radiator and free from the grill.

For the purpose of illustrating the invention, a portion of an automobile 10 has been shown in Fig. 1. This automobile includes a body 11 having a dash 12 and a windshield 13 extending upwardly therefrom. The forward portion of the body 10 is provided with a grill 14 which is placed immediately in front of the radiator 15. A hood 16 covers the radiator and is connected to the grill 14. The radiator 15 consists of a core 17 and manifolds 18 and 19 at the upper and lower ends of the same. The cooling liquid within the radiator 15 is circulated through the engine of the automobile in the customary manner, which forming no particular feature of the invention has not been shown in the drawing.

The invention proper is best shown in Fig. 2 and comprises a body 21 of rectangular form constructed from fairly thick cardboard, fiber board or some other suitable material. This body is of such dimensions that the same practically covers the entire area of the core 17 when placed in front of the same. At the corners of the body 21 are provided holes 22 through which wires may be inserted, which wires are threaded through the core 17 of the radiator 15 and twisted to hold the body 21 firmly attached to the radiator.

The upper portion of the body 21 is constructed with a number of segmental-shaped openings 23a, 23b, 23c and 23d which are circumferentially equally spaced and which are separated by segmental-shaped blades 24a, 24b, 24c and 24d. These blades are all attached to a central hub 25 which is located medially of the body 21 in a lateral direction, and upwardly of the center of the same.

Overlying the body 21 is a closure 26 which is circular in form and shaped like a disc. This closure is constructed with segmental-shaped openings 27a, 27b, 27c and 27d of the same size as the openings 23a, etc. and separated by blades 28a, 28b, 28c and 28d. There are the same number of openings 27a, etc. as there are openings 23a, etc. so that the various openings may be made to register with one another. The blades 28a, etc. are connected to a central hub 29 which overlies the hub 25 and to an annular rim 31 which overlies the portion of the body 21 outwardly of the openings 23a, etc.

Overlying the closure 26 is another closure 32 which is of the same dimensions as the closure 26 and which is constructed with segmental-shaped openings 33a, 33b, 33c and 33d. These openings are of substantially the same size as the openings 23a, etc. and openings 27a, etc. The same number of openings are formed in the closure 32 as in the body 21 and in the closure 26 so that said openings may all register with one another when the various closures are properly positioned with respect to the body 21. The openings 33a, etc. in the closure 32, provide blades 34a, 34b, 34c and 34d therebetween which are connected to a rim 35 overlying the rim 31 and a hub 36 overlying the hub 29. The angular extent of the various openings in the body 21 and in the closures 26 and 32 is equal to twice the angular extent of the blades therebetween. By means of this construction a minimum amount of obstruction is afforded to the passageway of air through the radiator core when the shutter is fully opened.

The two closures 26 and 32 are pivoted to the body 21 by means of a headed stud 37 which passes centrally through the three hubs 25, 29 and 36. The stud 37 also passes through a strap 38 which overlies the hub 36 of closure 32 and one of the blades 34a of said closure. These parts are held in position by means of a screw 39 which is threaded into the stud 37 and a washer 41 which overlies the outer surface of the strap 38. The strap 38 is attached to the blade 34a by means of a rivet 42.

The construction for oscillating the closure 32 is best shown in Figs. 2 and 3. The strap 38, as stated, is secured to the blade 34a of closure 32 by means of a rivet 42. This strap is constructed at its outer end with an off-set portion 43 spaced from the outer surface of the closure 32. This off-set portion has pivoted to it, by means of a screw 44, a swivel block 45. The closure 32 is oscillated by means of the block 45 through a flexible steel wire 46 which passes through a hole 47 in said block and is held in position in said hole by means of the screw 44. The wire 46 is slidably mounted in a flexible tubular housing 48 which extends through a mounting 49, secured to the body 21. Mounting 49 is threaded as indicated at 51 to receive a screw 52 engaging the rear surface of the body 21. The mounting 49 has a hole 53 extending through the same and in which the housing 48 is disposed. The housing is held in fixed position with reference to the mounting 49 by means of a set screw 54.

The end of the housing 48, has attached to it a shouldered sleeve 55 which is threaded at 56 to receive a nut 57. This sleeve is clamped to a bracket 58 by means of the nut 57. Bracket 58 is secured to the dash 12, of the automobile, by means of screws 59. The end of the wire 46, has secured to it a button 61 by means of which the same may be slid. The end 62, of the housing 48, may be adjusted with respect to the mounting 49 by means of the screw 54. This end forms a stop which limits the outer position of the button 61 and the closure 32 and permits of adjusting the device so that the movement of the closure 32 terminates when the openings 33a, etc. therein registers with the openings 27a, etc. in the body 21.

For moving the closure 26, a bar 63 is used which is secured to the upper side of the blade 28b of said closure by means of rivets 64. This bar has extending outwardly from it two lugs 65 and 66. The lug 65 is disposed at the edge 67 of the blade 28b while the lug 66 is disposed considerably outwardly from the other edge 68 of said blade. The two lugs 65 and 66 are adapted to engage the edges 71 and 72 of the blade 34c of the closure 32 and are so positioned that, when the edge 71 engages lug 65, the blades of the two closures overlie one another and when the edge 72 engages the lug 66 the two blades 28b and 34c barely overlap.

Mounted on the blade 24c of body 21 adjacent the edges 85 thereof is a stop 73 which is attached thereto by means of a rivet 74. This stop is so positioned that it limits the movement of the blade 34 with reference to the openings 23a, etc., and 27a, etc., so that the closures 26 and 32 cover the said openings when the stop is engaged by the lug 66. In this manner movement of the closures is terminated by the same lug when the closures are in fully closed position.

Immediately below the openings 23, in the body 21, are formed two spaced openings 74 and 75. A cover plate 76, pivoted to the body 21 at 77, is adapted to cover or uncover the openings 74 and 75. This plate has pivoted to it at 70 a link 78 which in turn is pivoted at 79 to the blade 34b of closure 32. When the closure 32 is rotated in a counter-clockwise direction, plate 76 is similarly rotated in a counter-clockwise direction and the openings 74 and 75 closed. When the closure 32 is moved in the opposite direction the openings 74 and 75 are open. The length of the link 78 and the positions of the rivets 77 and 79 is such that, when the two closures 26 and 32 are in fully closed position, the plate 76 is likewise in fully closed position.

In the installation of the invention on an automobile the shutter with the control mechanism attached is slipped in between the grill 14 and radiator 15 and wired to the core thereof by means of wires extending through the holes 22 and the openings in the core. The wire housing 48 passes around the radiator manifold 18 and makes a fairly sharp turn at such locality extending rearwardly toward the cab of the automobile. To hold the housing and wire in proper form a soft metal tube 81 is run over the housing, which tube is bent at the proper angle before installation. This bent tube holds the parts in proper position. The housing 55 passes through a bushing 82 in the drop plate 83 of the automobile and is secured by means of the bracket 58 to the flange 84 of the dash 12. Since any desired construction may be used for securing the housing to the dash the construction shown has not been illustrated in detail.

The operation of the invention is very simple. The operator, to open the radiator, pulls outwardly on the button 61. Since the operation of all of the parts is dependent upon the movement of the closure 32, the openings are proportionally varied as the button 61 is drawn outwardly. Since the openings in the shutter are controlled by the leading edges 72 of the blades of the closures 32 and by the trailing edges 85 of the blades of body 21, the position of the blades 28a, etc. of the closure 26 does not matter. However, when the openings in the shutter become larger than one-half the maximum opening the edge 71 engages the stop 65 and the two closures travel in unison. It becomes impossible, however, to increase the opening beyond the desired amount for which the shutter is set by the button 61 due to the fact that when closure 32 is in fully closed position stop 66 engages stop 73 and limits the movement of said closure so that the trailing edge thereof cannot pass the leading edge of the blades 24a, etc.

The advantages of my invention are manifest. An extremely simple and practical construction is provided which serves the desired purpose in a highly efficient manner. The shutter can be constructed of inexpensive material and when properly painted or varnished has considerable resistance to the weather. My invention can be constructed at a nominal cost. Due to the type of operating mechanism used, the device is free from rattles and noises. When the automobile is in motion the pressure of the wind through the grill and upon the closures hold the closures tight against the body and one another so that vibration or rattling is entirely prevented. The shutter can be installed without machining or reconstructing the automobile and can be as easily removed. By the use of the additional closure and the auxiliary openings positioned below the disc-like closures, all of the available space of the shutter is utilized and operated from a single control member.

Changes in the specific form of my invention, as herein disclosed, may be made within the scope of what is claimed without departing from the spirit of my invention.

Having described my invention, what I claim as new and desire to protect by Letters Patent is:

1. A radiator shutter comprising a planiform body of a height greater than its width, a set of segmental-shaped openings in said body arranged in the form of a circle and disposed in the upper portion thereof, a closure in the form of a disc pivoted to said body and having blades thereon adapted to close said openings, other openings in said body below said first named set of openings and in the plane thereof, a second closure in the form of a rectangular plate pivoted to said body about an axis parallel with the axis of said first named closure and adapted to swing in its plane to close said second named openings, an operating member, and means dependent upon the movement of said operating member for actuation of said closures.

2. A radiator shutter comprising a body having a set of segmental-shaped openings therein arranged in the form of a circle, a disc-like closure overlying said body and adapted to cover said openings, a plate overlying and engaging said closure near the center thereof, a pivot extending through said body, closure and plate, a fastener extending through said plate and closure and operating in conjunction with said pivot to restrain rotation of said plate with reference to said closure, a mounting secured to said plate, a flexible housing supported by said body and a wire within said housing and connected to said mounting and serving to operate said closure.

3. A radiator shutter comprising a body having a set of segmental-shaped openings therein arranged in the form of a circle, a disc-like closure overlying said body and adapted to cover said openings, a plate overlying and engaging said closure near the center thereof, a pivot extending through said body, closure and plate, a fastener extending through said plate and closure and operating in conjunction with said pivot to restrain rotation of said plate with reference to said closure, said plate having an off-set therein, a mounting secured to said off-set, a flexible housing supported by said body and a wire within said housing and connected to said mounting and serving to operate said closure.

4. A radiator shutter comprising a planiform body of a height greater than its width, a set of openings in said body arranged within a circle disposed at the upper portion of the body and extending substantially across said body, a closure in the form of a disc overlying said body, said disc having openings adapted to register with the openings in said body and intervening portions adapted to close said openings in the body, a pivot at the center of said circle and disc for supporting said disc for movement from closing to opening position, other openings in the body below the first named openings and arranged on opposite sides of a longitudinal line passing through said pivot, a second closure elongated in form and extending across the lowermost portion of the body and adapted to cover and uncover the second named openings in said body, a pivot at said longitudinal line and at the center of said second named closure and for guiding said second named closure for swinging movement in the plane thereof, an operating member, and means dependent upon the movement of said operating member for actuation of said closures.

5. A radiator shutter comprising a planiform body of a height greater than its width, a set of openings in said body arranged within a circle disposed at the upper portion of the body and extending substantially across said body, a closure in the form of a disc overlying said body, said disc having openings adapted to register with the openings in said body and intervening portions adapted to close said openings in the body, a pivot at the center of said circle and disc for supporting said disc for movement from closing to opening position, an opening in said body below the first named openings and arranged on one side of a longitudinal line passing through the center of said circle and near said first named openings, another opening in the body below the first named openings and arranged on the opposite side of said longitudinal line and near the bottom of said body, a second closeur elongated in form and extending along the lowermost portion of the body and of a width less than the distance between said circle and the lowermost edge of the body and of a width greater than the width of said last named openings in the body, said closure being adapted to cover and uncover the last named openings in the body, a pivot at said longitudinal line and at the center of said second named closure for guiding said second named closure for swinging movement in the plane thereof, an operating member, and means dependent on the movement of said operating member for actuation of said closures.

6. A radiator shutter comprising a planiform body of a height greater than its width, a set of openings in said body arranged within a circle disposed at the upper portion of the body and extending substantially across said body, a closure in the form of a disc overlying said body, said disc having openings adapted to register with the openings in said body and intervening portions adapted to close said openings in the body, a pivot at the center of said circle and disc for supporting said disc for movement from closing to opening position, other openings in the body below the first named openings and arranged on opposite sides of a longitudinal line passing through said pivot, a second closure elongated in form and extending across the lowermost portion of the body and adapted to cover and uncover the second named openings in said body, a pivot at said longitudinal line and at the center of said second named closure for guiding said second named closure for swinging movement in the plane thereof, an operating member pivoted to said first named closure and a link pivoted to said first named closure and to said second named closure and lying in the planes of said closures for causing simultaneous operation of said closures.

LEON H. NORBY.